United States Patent [19]
Teo et al.

[11] Patent Number: 5,575,290
[45] Date of Patent: Nov. 19, 1996

[54] COARSE-FINE ULTRASOUND TRANSDUCER ARRAY FOR MEDICAL IMAGING

[75] Inventors: Tat-Jin Teo, Redmond; John R. Klepper, Seattle, both of Wash.

[73] Assignee: Siemens Medical Systems, Inc., Iselin, N.J.

[21] Appl. No.: 497,627

[22] Filed: Jun. 30, 1995

[51] Int. Cl.$^6$ ...................................................... A61B 8/00
[52] U.S. Cl. ...................................................... 128/661.10
[58] Field of Search ....................... 128/660.07, 660.08, 128/661.10; 73/624, 625, 626, 628; 367/103, 104, 105

[56] References Cited

U.S. PATENT DOCUMENTS

| | | |
|---|---|---|
| 4,180,790 | 12/1979 | Thomas . |
| 4,180,792 | 12/1979 | Lederman et al. ......................... 73/626 |
| 5,278,757 | 1/1994 | Hoctor et al. . |
| 5,349,262 | 9/1994 | Grenon et al. . |
| 5,431,167 | 7/1995 | Savord ............................... 128/660.07 |

OTHER PUBLICATIONS

Turnbull et al.; "Beam Steering with Pulsed Two-Dimensional Transducer Arrays;" *IEEE Trans. Ultrasonics, Ferroelectrics and Frequency Control;* vol. 38, No. 4 Jul. 1991.

Defranould et al.; "Design of a Two Dimensional Array for B and C Ultrasonic Imaging System;" 1977 Ultrasonics Symposium Proceedings, IEEE Cat. 77CH1264–1SU.

Lockwood et al.; "Optimizing Sparse Two–Dimensional Transducer Arrays Using an Effective Aperture Approach;" Date Unknown.

*Primary Examiner*—George Manuel

[57] ABSTRACT

The ultrasound transducer array defines an average row spacing along the elevation for receiving transducer elements that differs from an average row spacing along the elevation for transmitting transducer elements. In one embodiment a relatively "coarse" row spacing is used for reception and a relatively "fine" row spacing is used for transmission. The differing spacings lead to different transmit-elevation and receive-elevation beam-patterns. In one configuration the number of transducer elements, and correspondingly the number of ultrasound processing channels, is reduced. In an alternative configuration the beam-pattern "footprint" is increased without increasing the number of transducer elements or processing channels. The array includes dedicated transmit-only elements and/or dedicated receive-only elements, together with coincident, time-shared transmit/receive elements. The coarse-fine spacings enable improved elevational focus without substantially increasing side lobe levels in a focal plane and far field portion of a resulting beam-pattern.

22 Claims, 8 Drawing Sheets

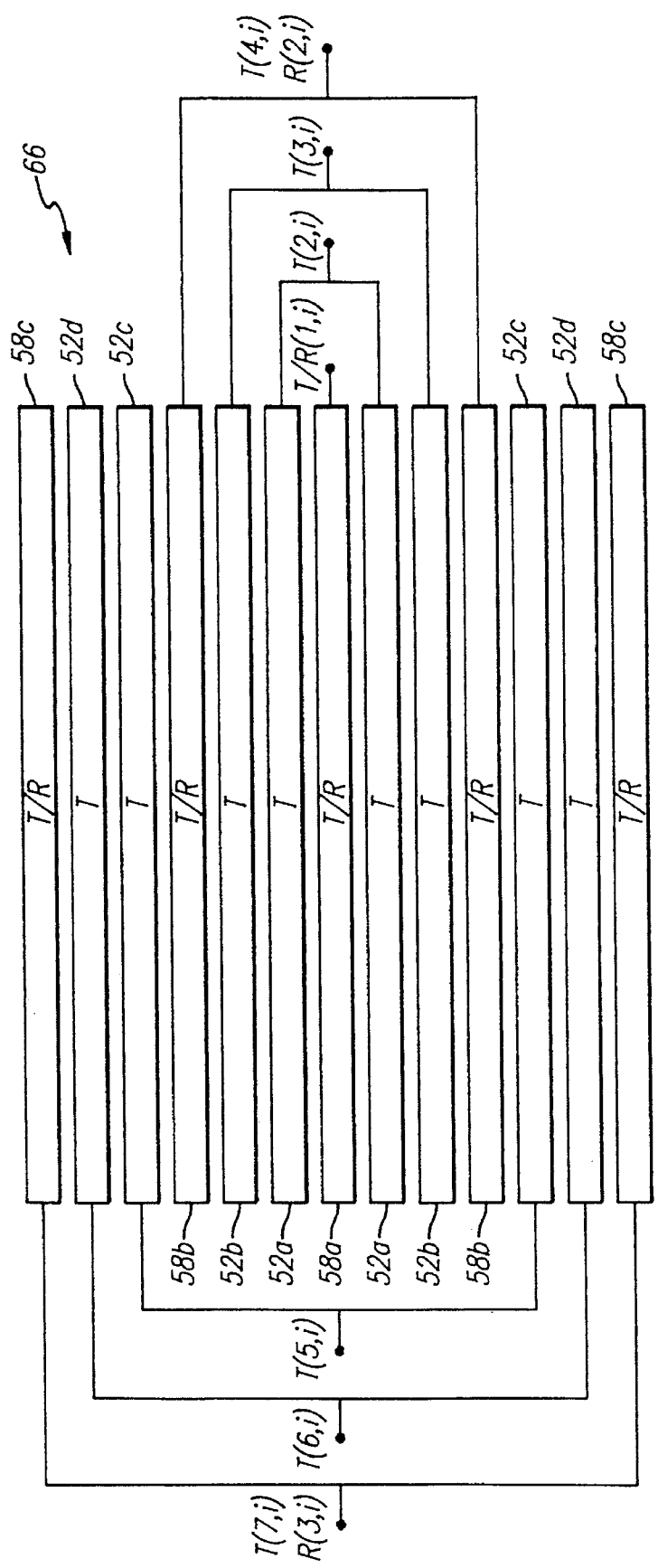

COARSE-FINE ULTRASOUND TRANSDUCER ARRAY FOR MEDICAL IMAGING

BACKGROUND OF THE INVENTION

This invention relates to a transducer element configuration for an ultrasound transducer array.

FIG. 1 depicts a conventional filled 2D ultrasound transducer array 10. The array 10 includes a plurality of rows 12 of transducer elements 14. Each element 14 is formed of a piezoelectric material. Each row 12 extends along an azimuthal ("x") direction. The rows 12 are parallel and spaced orthogonally in an elevation ("y") direction. The elements 14 receive high frequency electronic signals and convert the electronic power into mechanical ultrasound energy. The elements 14 emit ultrasound signals in a generally orthogonal depth ("Z") direction. Conventionally, the elements 14 serve as both transmitting elements and receiving elements. During operation, the function of elements 14 periodically switches between transmission and receptzon. Thus, the transmitting elements and receiving elements are "coincident," "time shared" elements.

For a conventional 1D array the transducer array 10 includes only one row 12 of elements 14. Transmit and receive elements are coincident, time-shared elements 14. The final beam-pattern is defined along one dimension (e.g., the length of the row). To meaningfully scan a patient's anatomy with an ultrasound transducer array, the arrays final beam-pattern is controlled using beam-forming parameters. In particular, the number of transducer elements and the transmit and receive profiles among the elements are controlled. The net wave pattern of transmitted and reflected ultrasound signals defines the final beam-pattern. The beam-forming control parameters include: aperture, apodization, focus and steering. Aperture is a control of the number of active elements 14 along the azimuth. Apodization is a voltage weighting profile of the active elements 14. Focus is a time delay profile of such weighting. Steering is a control of focus "depth" point(s) along the azimuth. In a 1D array azimuthal aperture, apodization, focus and steering parameters serve as the beam-forming control parameters.

The quality of focus in an ultrasound system is physically limited by the size of a transducer array's aperture. Typically, this aperture is subdivided into many transducer elements along the azimuth direction of the array. Amplitude and phase of transmitted and received signals at each element are individually adjusted. Each active element in such a design requires a separate set of electronics to adjust the gain and delay of individual signals prior to beam-forming and focussing. As many as 128 such channels are typical to generate focus along the azimuth.

Overall image quality is affected not only by azimuthal focus, but also by elevational focus. A fixed focus lens is generally attached to the face of a 1D transducer array to provide for a single focus along the elevation. This does not allow for electronic control of the elevational focus as a function of distance from the transducer face. One solution is to subdivide the transducer array into elements, not only along the azimuth, but also along the elevation to form a two-dimensional array with each element having its own electronics.

Such a 2D structure having electronics for each transducer elements adds processing overhead and cost to the ultrasound system. Both of these are concerns in the ultrasound field. Ultrasound imaging typically is a processing intensive operation. Specifically, each channel (i.e., independent element of a transducer array) provides ultrasound vector data to be processed at a given sampling rate. Data from the multiple channels is used to create an image. Typically, a large number of channels enhances resolution and image quality. However, as the number of channels increases, the throughput requirements for imaging also increase. Thus, the types of algorithms or other vector/image processes performed on input data typically is limited by a system's throughput capability. Accordingly, it is desirable to reduce the number of channels or otherwise ease the processing burden while maintaining or improving image quality.

With regard to cost, it is desirable to reduce cost while maintaining or improving performance or while redefining performance needs.

To reduce the cost and complexity of the two-dimensional array Defranould and Souquet (1977) demonstrated a bidimensional array in which one focuses in one direction (e.g., azimuth) on transmit and in the other direction (e.g., elevation) on receive. This was accomplished by centrally locating a column of transducer elements subdivided in elevation between rows of elements subdivided laterally. A shortcoming of such array, however, is that mechanical scanning is needed to obtain data for a 2D image. Another approach is presented by Turnbull and Foster (1991) in which a sparse 2D array is formed. For a sparse 2D array, elements throughout the aperture are chosen at random to reduce the number of channels of electronics. As a result, focus along the elevation and azimuth occurs at the expense of other performance criteria. Specifically, side lobe levels increase and transducer gain decrease in an undesirable manner.

In U.S. Pat. No. 5,278,757, Hoctor and Kassam describe a synthetic aperture system using a reduced redundancy phased array. They describe an array with amplitude weightings and non-uniformly spaced ultrasonic transducers during transmit and receive modes. A number of component images are formed which when added together define a single image formed by a scanned beam of uniformly spaced transducers with the designated aperture. Azimuthal focussing is described. A shortcoming of this approach is that multiple images are needed to form a final visually displayed image. Accordingly there is a need for a 2D array structure which improves elevational focus for real-time imaging applications without significant throughput and cost penalties.

SUMMARY OF THE INVENTION

According to the invention, a multiple-row transducer array has different row spacing among receive-element rows than among transmit-element rows. The differing spacing leads to different transmit-elevation and receive-elevation beam-patterns. The combined beam-pattern is controlled to effectively capture an ultrasound image. In one configuration, the number of elements (and thus processing channels) relative to a corresponding conventional array is reduced. In another configuration, the array footprint is increased using the same number of elements so as to improve performance without adding all the extra elements as would be done for a conventional array configuration.

According to one aspect of the invention, the array includes dedicated transmit-only elements and/or dedicated receive-only elements, together with coincident, time-shared transmit/receive elements.

In the preferred embodiment, the transducer array defines an average row spacing among receiving transducer elements that is larger than an average row spacing among transmitting transducer elements. Thus, a relatively "coarse" spacing is used for reception and a relatively "fine" spacing is used for transmission. The row spacings referred to occur along an elevational direction of the transducer, and are distinguished from element spacings which occur along an azimuthal direction of the transducer.

According to one configuration of the transducer array, there are an equal number of transducer elements performing a receive function as are performing a transmit function. Due to the coarser spacing for receive rows, the aperture extends a longer elevation for reception than for transmission. In one embodiment the receive-element row spacing is approximately equal to the transmit elevation aperture. Also, in some embodiments having differing elevation and azimuthal aperture distances, the number of elements performing a receive function differs from the number of elements performing a transmit function.

According to another configuration of the transducer array, the elevation aperture is the same width for both reception and transmission. Due to a coarser row spacing among receiving transducer elements along the common aperture width, fewer transducer elements are used for reception than for transmission. In some embodiments the number of elements performing a receive function differs from the number of elements performing a transmit function, while the receive aperture spans the same elevation as the transmit aperture.

According to another aspect of the invention, the transducer array includes one or more pairs of transducer array rows dedicated to transmitting ultrasound signals.

According to another aspect of the invention, the transducer array includes one or more pairs of transducer array rows dedicated to receiving ultrasound signals.

According to various embodiments, the transducer array also includes one or more rows of time-shared transducer elements performing both transmit and receive functions.

According to another aspect of the invention transducer elements are symmetrical along the elevation eliminating an elevation steering parameter from the beam-forming control parameters and limiting an elevational focus parameter to symmetrical focussing and limiting an elevational apodization parameter to a symmetrical apodization profile.

The problem addressed by this invention is how to reduce the number of processing channels while maintaining or improving ultrasound medical-imaging performance, (and in particular improving elevational focus). Also addressed is how to reduce system costs. The solution is to provide a "coarse-fine" transducer array in which receive-element row-spacing differs from transmit-element row-spacing. In one configuration, fewer receive elements are used than transmit elements. Thus, fewer processing channels are implemented lessening throughput overhead. In addition fewer receiver circuits are needed, thereby reducing cost. In another configuration the same number of receive elements and transmit elements are used. However a wider elevation aperture is used for receiving than for transmitting. Compared to a conventional system having such an elevation aperture, relatively fewer receive elements are used while maintaining effective performance in the focal-plane and far-field.

One advantage of the invention is that disclosed transducer structures improve elevational focusing. Another advantage is that the use of fewer processing channels frees up processor time for performing more intensive vector/ image processing tasks. The trade-off in instances leads to improved image quality. Another advantage is that the fewer or relatively fewer receiver elements leads to reduced component costs.

BRIEF DESCRIPTION OF THE DRAWINGS

FIG. 8 is a diagram of another ultrasound transducer array configuration according to an embodiment of this invention;

DESCRIPTION OF SPECIFIC EMBODIMENTS

Overview

Figure 1:
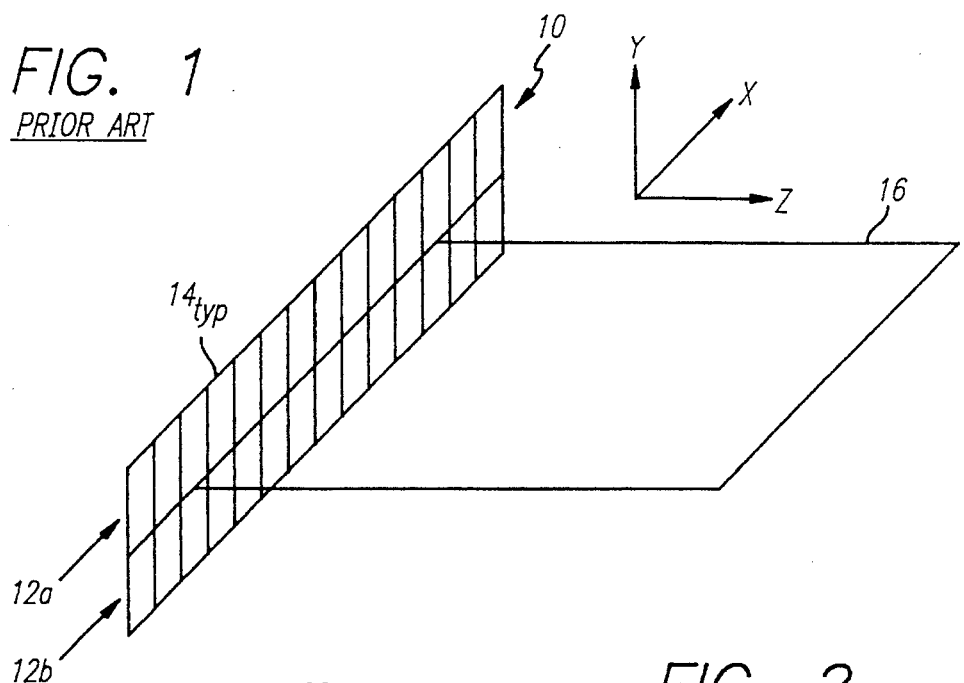
FIG. 1 is a block diagram of a conventional ultrasound transducer array.
Figure 2:
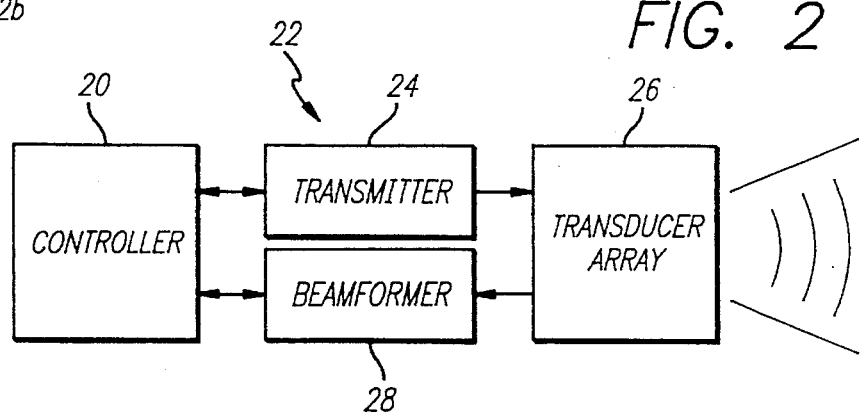
FIG. 2 is a block diagram of an ultrasound signal generating/receiving portion of an ultrasound medical-imaging system having a transducer array according to an embodiment of this invention.

FIG. 2 shows a block diagram of a controller 20 and front end portion 22 of an ultrasound medical-imaging system. During operation, system control signals are output To the ultrasound front end 22. A transmitter 24 generates output signals to a transducer 26 to define aperture, apodization, focus and steering of transmitted ultrasound signals. The transducer 26 is an array of transducer elements. The elements define multiple channels, each channel for transmitting and/or receiving ultrasound signals. Transmitted ultrasound signals are in part absorbed, dispersed, refracted and reflected when traveling through a patient. Reflected signals are sensed by the transducer 26 and received at beam-former 28. The received signals are captured as a patterned beam based upon aperture, focus, apodization and steering parameters, then sent to various processing subsystems (not shown) for vector processing, scan conversion, image processing and video processing. Ultimately, visual images are displayed of a scanned anatomy.

Coarse-Fine Array Configurations

Figure 3:
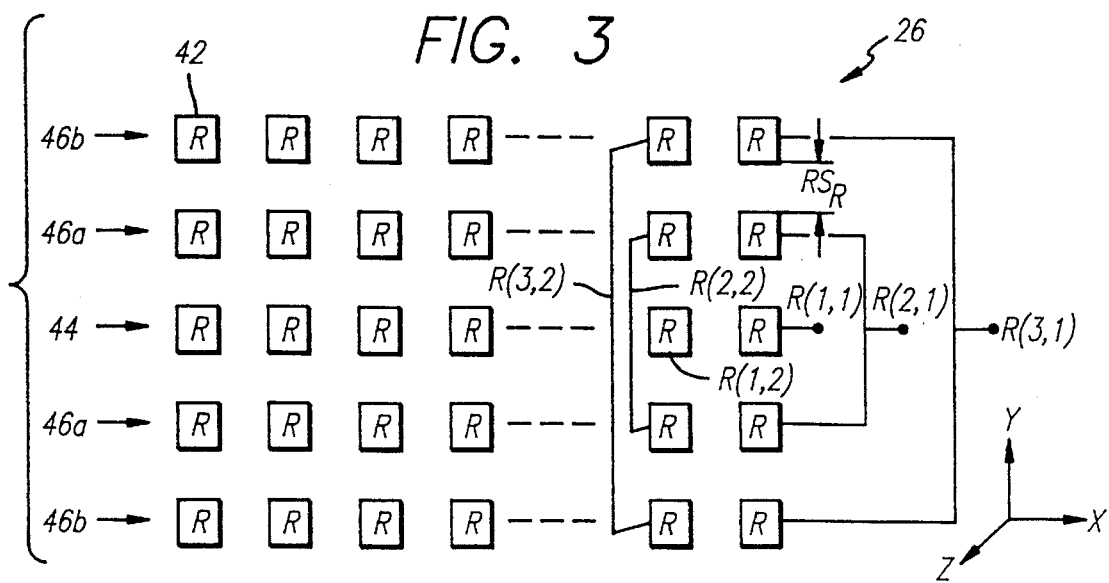
FIG. 3 is a diagram of transducer receive elements aligned in rows at a given row spacing for a transducer array according to an embodiment of this invention.
Figure 4:
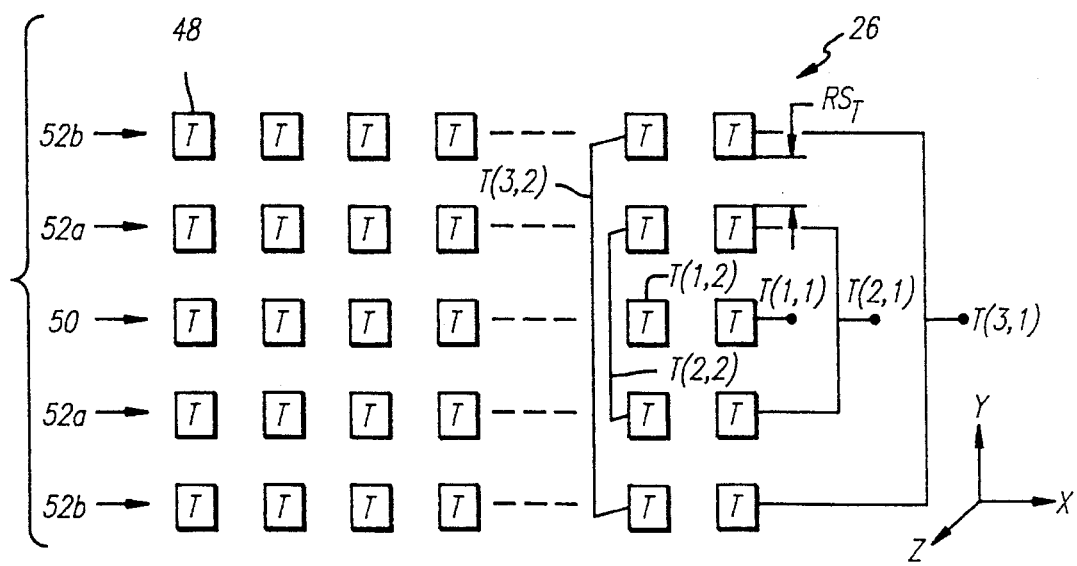
FIG. 4 is a diagram of transducer transmit elements aligned in rows at a given row spacing for a transducer array according to an embodiment of this invention.

FIGS. 3–4 show respective receive elements 42 and transmit elements 48 for the transducer array 26 of FIG. 2. According to various embodiments there are a plurality of receive-element rows 44, 46 and a plurality of transmit-element rows 50, 52. The receive-element rows 44, 46 have a row spacing designated as $RS_R$. The transmit-element rows 50, 52 have a row spacing designated as $RS_T$. According to the invention the receive-element row spacing, $RS_R$, differs from the transmit-element row spacing, $RS_T$. In preferred embodiments the receive-element row spacing, $RS_R$, is greater than the transmit-element row spacing, $RS_T$. In alternative embodiments the receive-element row spacing, $RS_R$, is less than the transmit-element row spacing, $RS_T$. As illustrated the row spacing is constant at one value among the receive-element rows 44, 46 and constant at another value among the transmit-element rows 50, 52. In alternate embodiments, however, the row spacing may vary among the receive-element rows 44, 46 and/or among the transmit-element rows 50, 52, but have an average receive-element row spacing $RS_{R(avg)}$ which differs from an average transmit-element row spacing $RS_{R(avg)}$. The term "coarse-fine" is used in this specification to refer to the characteristic of different average row spacing for receive-element rows 44, 46 relative to transmit-element rows 50, 52.

Preferably each row 44, 46, 50, 52 includes the same number of elements, although alternative embodiments include a varying number of elements for respective receive-element rows 44, 46 and/or respective transmit-element rows 50, 52. The illustrated embodiment shows 5 receive-element rows 44, 46a, 46b, although the number of rows may vary. Similarly, the embodiment shows 5 transmit-element rows 50, 52a, 52b, although the number of rows may vary. According to various embodiments, one or more rows 58 (see FIGS. 5–8) define time-shared coincident transducer elements serving at one point in time as receive-element rows 44 and/or 46, and at another moment in time as transmit-element rows and/or 52.

The coarse-fine transducer array 26 depicted by through FIGS. 3 and 4 embodies a 1.5D array, that is, an array in which the elevation direction may be focussed independently of the azimuth direction. FIGS. 5–8 also depict 1.5D coarse-fine transducer arrays. For each 1.5D array, the transducer receive-elements 42 (see FIG. 3) are symmetrically arranged with a center row 44 and two pairs of outer rows 46a and 46b. For the center row 44, each element 42i receives an independent electronic signal —R(1,i). For the outer row pairs 46a, 46b, each pair symmetrically-positioned elements receives a common signal—R(2,i) or R(3,i). Similarly, the transducer transmit-elements 48 (see FIG. 4) are symmetrically arranged with a center row 50 and two pairs of outer rows 52a and 52b. For the center row 50, each element 48i receives an independent electronic signal —T(1, i). For the outer row pairs 52a, 52b, each pair of symmetrically-positioned elements receives a common signal— T(2, i) qr T(3,i). Such a symmetrical configuration reduces the number of independent processing channels easing the processing burden. As a tradeoff, however, beam-forming controls along the elevation (e.g., y-axis) are limited. Specifically, (i) steering control along the elevation is omitted, (ii) focussing along the elevation is limited to symmetrical focussing, and (iii) the apodization profile along the elevation is limited to symmetrical apodization profiles. Such limitations distinguish the 1.5D array embodiments from 2D array embodiments. 2D embodiments also are encompassed by this invention and are the same as depicted in FIGS. 3–8, but have independent electronic signal inputs for each element of each row. For example, instead of signal R(2,1) going to the two symmetrical elements in both rows 46a, two independent signals go to such elements.

Figure 5:
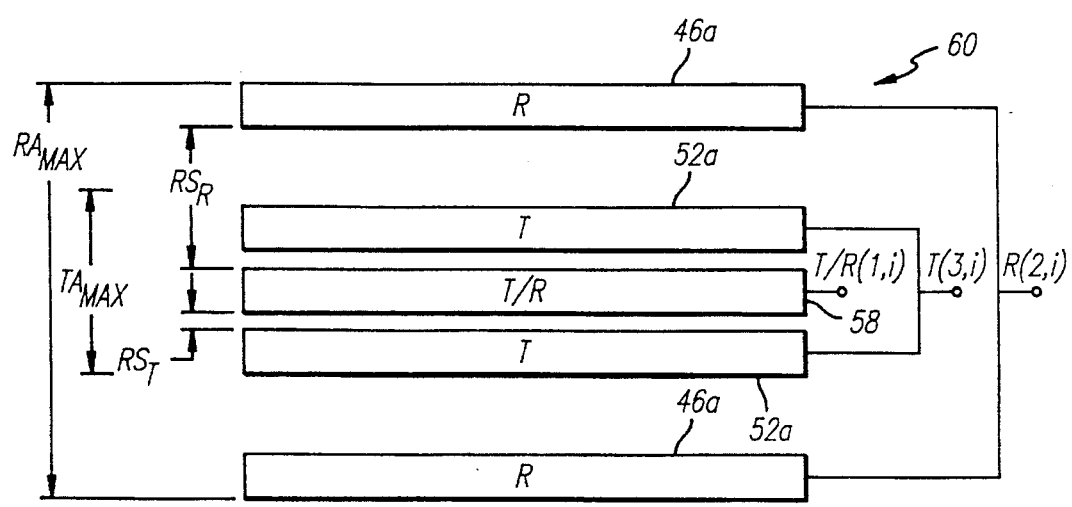
FIG. 5 is a diagram of an ultrasound transducer array configuration according to an embodiment of this invention.

For each embodiment of array 26 elevation spacing (i.e., row spacing) is on the order of a few wavelengths up to approximately 10 wavelengths, while azimuthal spacing (i.e., column spacing) is typically 0.25 or 0.5 wavelengths up to approximately 2.0 wavelengths. An exemplary azimuthal spacing is 0.3 mm. An exemplary receive-element row spacing is 7.0 mm. An exemplary transmit-element row spacing is 3.5 mm. Each element 42, 48 extends over an area of approximately 0.3 mm along the azimuth and 7 mm along the elevation, although the specific dimensions vary according to the embodiment FIGS. 5–8 show various configurations of the coarse-fine transducer array 26 according to alternative embodiments of this invention. FIG. 5 shows a coarse-fine transducer array 60 having a center row 58 of time-shared transmit/receive elements,, performing both transmit and receive functions. Also included are a pair of transmit-element rows 52a and a pair of receive-element rows 46a. Other embodiments of array 60 have a plurality of transmit-element row pairs 52 and/or a plurality of receive-element row pairs 46. In the illustrated embodiment 60 the three rows 46a, 46a and 58 define the receive rows. The three rows 52a, 52a and 58 define the transmit rows. According to one embodiment of transducer 60, the number of receive elements 42 (see FIG. 3) is the same as the number of transmit elements 48 (see FIG. 4). For an exemplary embodiment having 64 elements per row, the transducer 60 is referred to as a 64×3 1.5D coarse-fine array. In alternative embodiments the number of receive-elements 42 differs from the number of transmit-elements 48.

As shown in FIG. 5, the maximum receive elevation aperture encompasses row 58 and the pair of rows 46a. The maximum transmit elevation aperture encompasses row 58 and the pair of rows 52a. Because the receive-element row spacing, $RS_R$, is greater than the transmit-element row spacing, $RS_T$, the maximum receive elevation aperture, $RA_{max}$, spans a greater distance than the maximum transmit aperture, $TA_{max}$. In a specific embodiment, the receive-element row spacing, $RS_R$, is equal to the maximum transmit elevation aperture distance, $TA_{max}$. In other embodiments, the receive-element row spacing, $RS_R$, is either greater or lesser than the maximum transmit elevation aperture distance, $TA_{max}$.

Figure 6:
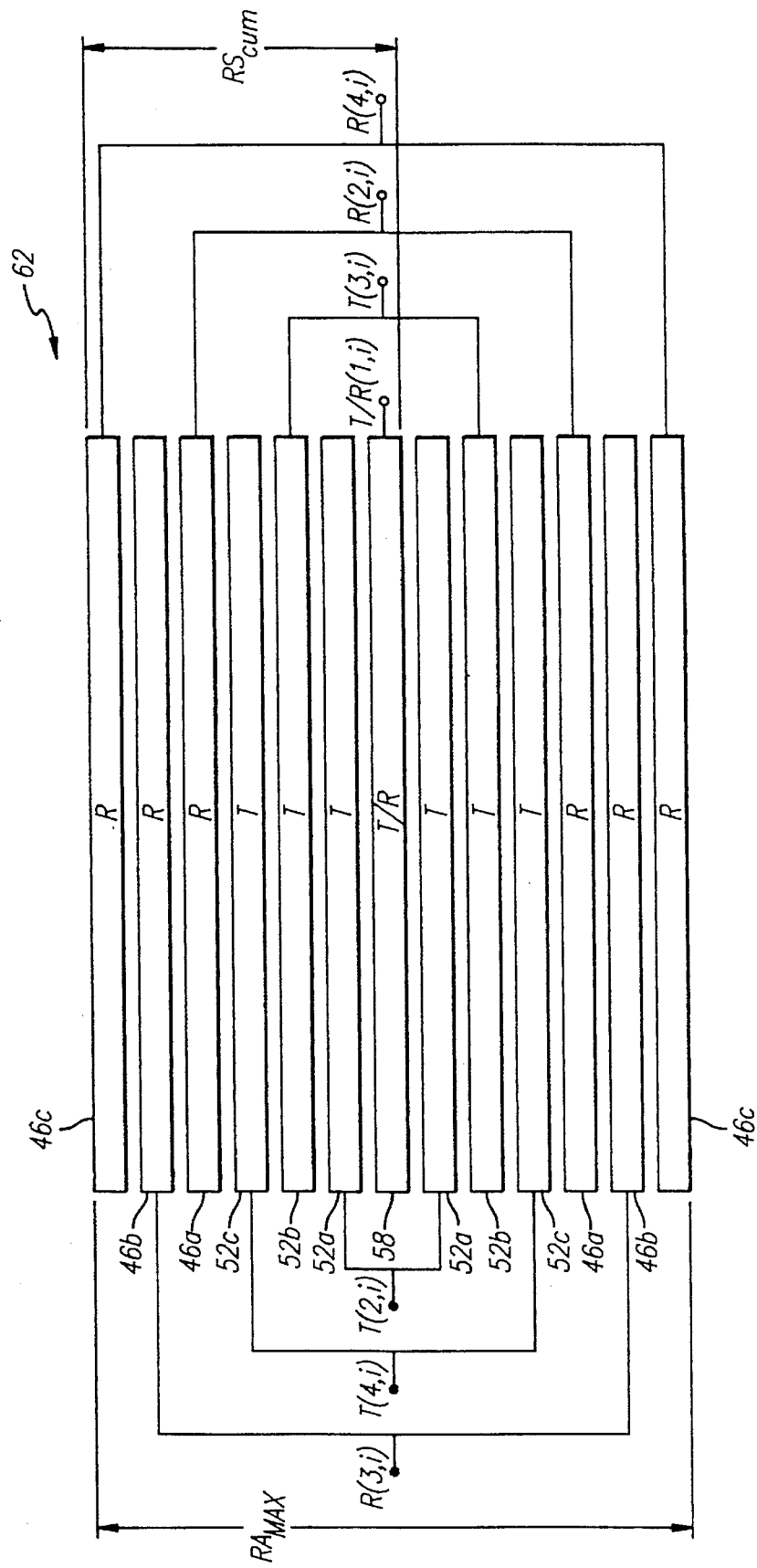
FIG. 6 is a diagram of another ultrasound transducer array configuration according to an embodiment of this invention.

FIG. 6 shows another coarse-fine transducer array embodiment 62, which includes a center row 58 performing both transmit and receive functions, and further includes multiple pairs of transmit-element rows 52a, 52b, 52c and multiple pairs of receive-element rows 46a, 46b, 46c. The seven rows 46, 58 define the receive rows. The seven rows 52, 58 define the transmit rows. As shown the receive-element rows 46 other than the time-shared row 58 all are positioned outside of all the transmit-element rows 52.

The maximum receive elevation aperture encompasses row 58 and the row pairs 46a, 46b and 46c. The maximum transmit elevation aperture encompasses row 58 and the row pairs 52a, 52b and 52c. As shown in FIG. 6, the seven transmit-element rows 52, 58 encompass a maximum elevation aperture less than the seven receive-element rows 46, 58. Thus, the average row spacing for the transmit-element rows 52, 58 is less than that for the receive-element rows 46, 58. Specifically, the average receive-element row spacing is the maximum receive elevation aperture $RA_{max}$ divided by the number of receive-element row 46, 58 spaces (e.g., $RA_{max}/6$).

Although FIG. 6 depicts one time-shared row 58 plus three pairs of transmit-element rows 52a, 52b and 52c three pairs of receive-element rows 46a, 46b and 46cother embodiments have a plurality of time-shared rows 58 and a varying number of transmit-element row pairs 52 and/or receive-element row pairs 46. For an exemplary embodiment having 64 elements per row, the transducer 62 is referred to as a 64×7 1.5D coarse-fine array.

Figure 7:
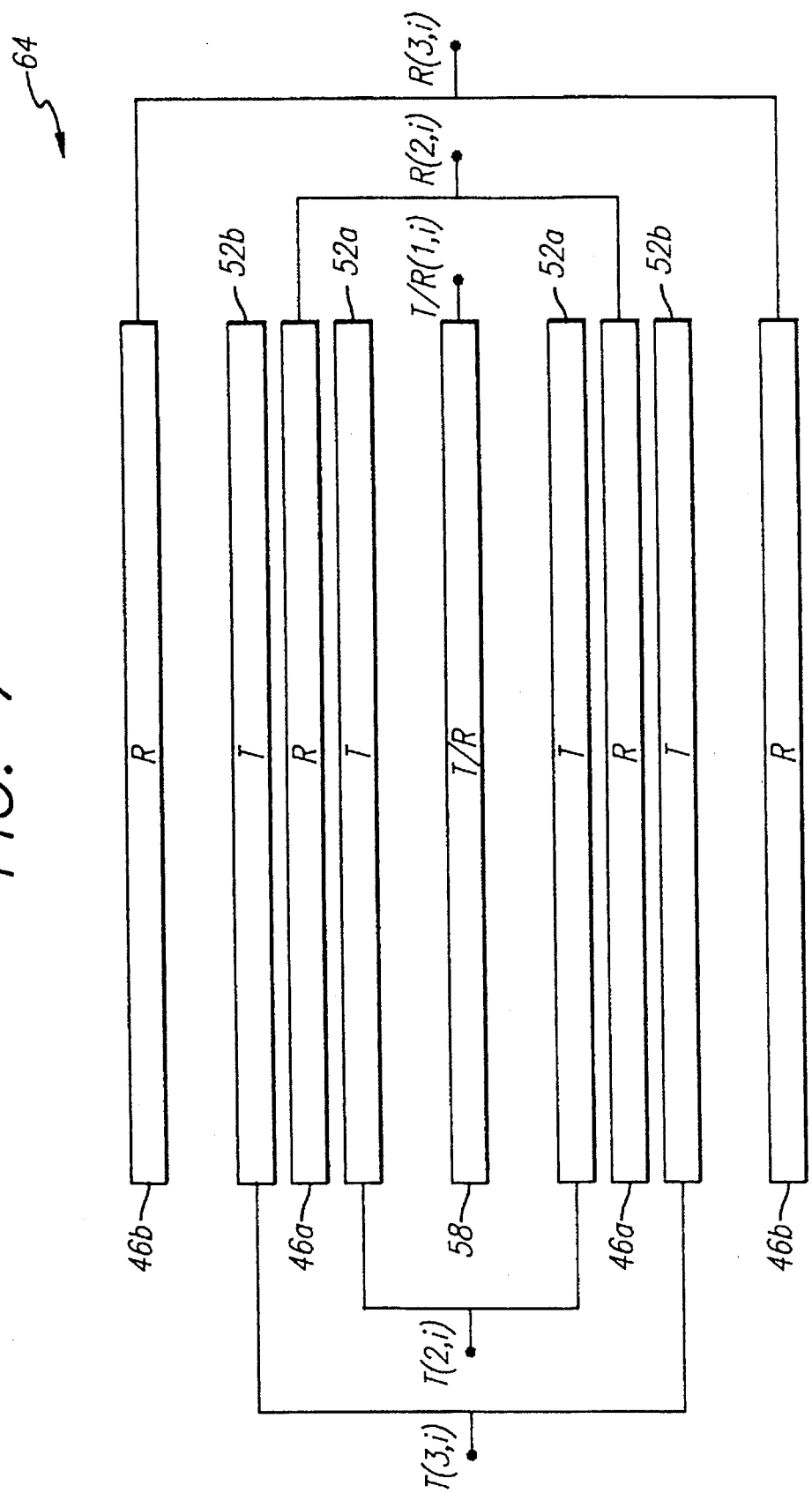
FIG. 7 is a diagram of another ultrasound transducer array configuration according to an embodiment of this invention.

FIG. 7 shows another coarse-fine transducer array embodiment 54, which includes a center row 58 performing both transmit and receive functions, and further includes multiple pairs of transmit-element rows 52a, 52b and multiple pairs of receive-element rows 46a, 46b. The five rows 46, 58 define the receive rows. The five rows 52, 58 define the transmit rows. As shown a receive-element row pair 46a is interleaved between transmit-element row pairs 52a, 52b, respectively. Although only one receive-element row pair is shown interleaved, in other embodiments a plurality of receive-element row pairs are interleaved. For example two or more receive-element row pairs are positioned between two transmit-element row pairs. In another example, one or more receive element row pairs are interleaved among several transmit-element row pairs.

As shown in FIG. 7, the maximum receive elevation aperture encompasses row 58 and the row pairs 46a and 46b. The maximum transmit elevation aperture encompasses row 58 and the row pairs 52a and 52b. The five transmit-element rows 52, 58 encompass a maximum elevation aperture less than the five receive-element rows 46, 58. Thus, the average row spacing for the transmit-element rows 52, 58 is less than that for the receive-element rows 46, 58. In one embodiment, the receive-element row spacing is constant. In other embodiments the receive-element row spacing varies among the receive-element rows 46, 58.

Although FIG. 6 depicts one time-shared row 58 plus two pairs of transmit-element rows 52a, 52b and two pairs of receive-element rows 46a, 46b, other embodiments have a plurality of time-shared rows 58 and a varying number of transmit-element row pairs 52 and/or a plurality of receive-element row pairs 46. For an exemplary embodiment having 64 elements per row, the transducer 64 is referred to as a 64×5 1.5D coarse-fine array.

Under an alternative method of implementation an array embodiment 66 (see FIG. 8), the elevation aperture is the same for both transmission and reception. The number of rows used for reception, however, differs from the number used for transmission. According to preferred embodiments, the number of rows performing a receive function is less than the number performing a transmit function. Referring to FIG. 8, five rows (e.g., row 58a, plus row pairs 58b and 58c) define the receive aperture, while thirteen rows (e.g., row 58a and row pairs 58b –c and 52a–d) define the transmit aperture. The variation in spacing within the common aperture size results in a coarse spacing for receive rows along the elevation and a fine spacing for transmit rows along the elevation. For an exemplary embodiment having 64 elements per row, the transducer 66 is referred to as a 64×13 transmit, 64×5 receive 1.5D coarse-fine array.

Although all the receive-element rows are shown as being embodied by rows 58 of time-shared transmit/receive elements, other embodiments include dedicated receive-element rows 44 or row pairs 46. Such row(s) 44 are centrally located. Such row pairs 46 are interspersed among transmit-only rows 52, receive only rows 46, and/or time-shared rows 58. Furthermore, it is to be understood that the rows of elements shown in FIGS. 5–8 are also functionally grouped in columns as shown in FIGS. 3 and 4. Conventional delay and apodizanion are applied to the signals from the element columns before conventional summing in order to form a beam.

Referring to FIGS. 3–8, each row 44, 46, 50, 52, 58 includes a plurality of transducer elements with either one or both of transmit circuitry and receive circuitry. Receive-element rows 44, 46 include transducer elements 42 with at least the receiver circuitry. Transmit-element rows 50, 52 include transducer elements 48 with at least the transmitter circuitry. Each element of a time-shared row 58 includes both transmitter circuitry and receiver circuitry. The number of transducer elements in a respective row is defined according to the embodiment. An exemplary embodiment includes 64 elements/row. Another exemplary embodiment includes 85 elements/row. Yet another exemplary embodiment includes 128 elements/row. In specific embodiments each row 44, 46, 50, 52, 58 typically includes the same number of elements.

1.5D Coarse-Fine Array Operation—Normal

In operation, a number of elements 48 along the azimuthal direction and a number of rows 50, 52, and/or 58 along the elevation direction are selected to define a transmit aperture. Electronic signals are sent from a transmitter 24 under control of a system controller 20 to define ultrasound output signals having a specified azimuthal aperture, focus, apodization and steering and a specified elevational aperture, focus and apodization. The focus is symmetrical along the elevation. The apodization profile also is symmetrical along the elevation.

The ultrasound signals enter into a scanned area of a patient and are in-part absorbed, dispersed, refracted and reflected. Reflected ultrasound signals are received at transducer receive-elements 42, which convert the reflected ultrasound signals back into electronic signals. The beam-former 28 defines an azimuthal aperture and elevation aperture and responds to focus, apodization and steering controls to detect an ultrasound beam pattern. The final beam-pattern is a function of the patient's anatomy and the beam-forming azimuthal and elevational control parameters. Beam profiles in near field, focal plane and far field are used to measure the array performance. Data samples are routed elsewhere in the ultrasound system for vector processing, scan conversion, video processing and/or image processing.

1.5D Coarse-Fine Array Performance

For 1.5D array embodiments, performance is best when the ratio of receive elevation aperture distance to the receive azimuthal aperture distance is greater than or equal to one. Effective imaging also is obtained at significantly lower ratios.

FIGS. 9a–f show beam pattern comparisons of a 64×3 1.5D coarse-fine array 60 and a 64×7 1.5D conventional array at various depths in XZ and YZ scan-planes according to a spatial impulse response simulation. The excitation waveform is generated as $v(t)=At^3 e^{-kft}\cos(2\pi ft)$, where k=3.833, A=1 and f=2.5 MHz. Simulation computations are based upon the algorithms described in "Diffraction impulse response of rectangular transducers" by Jose Luis San Emeterio and Juis G. Ullate; JASA 1992.

Figure 9A:
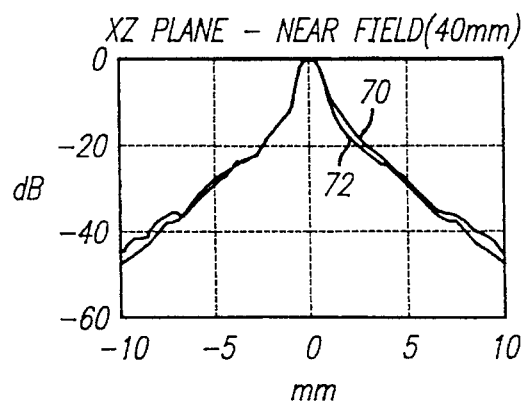
FIGS. 9a–f are beam pattern comparisons between a 1.5D array embodiment corresponding to FIG. 6 and a conventional 1.5D array for XZ and YZ scan-planes at three depths.
Figure 9B:
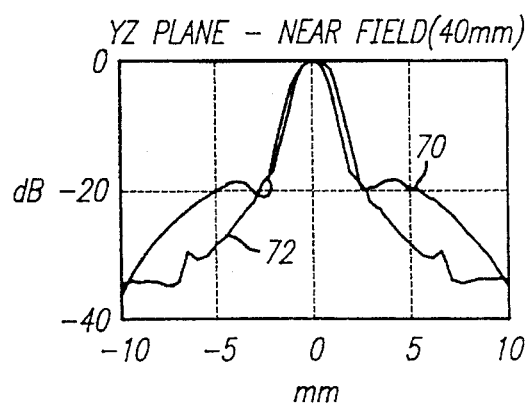
Figure 9C:
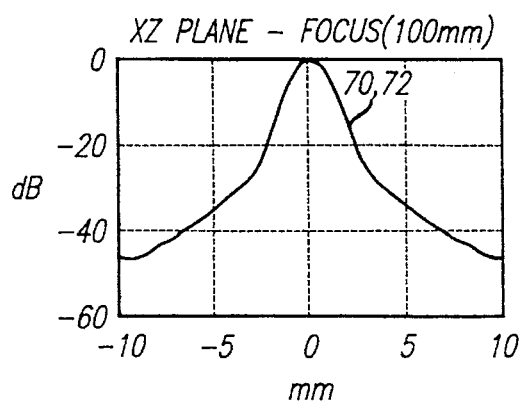
Figure 9D:
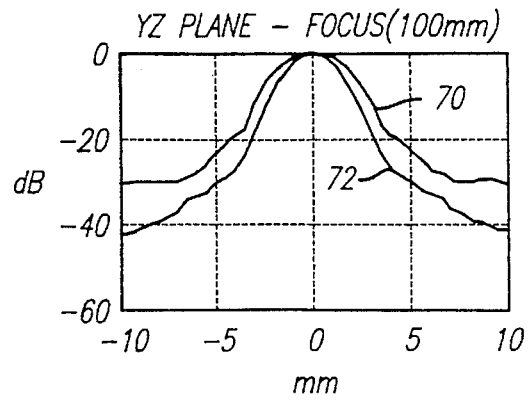
Figure 9E:
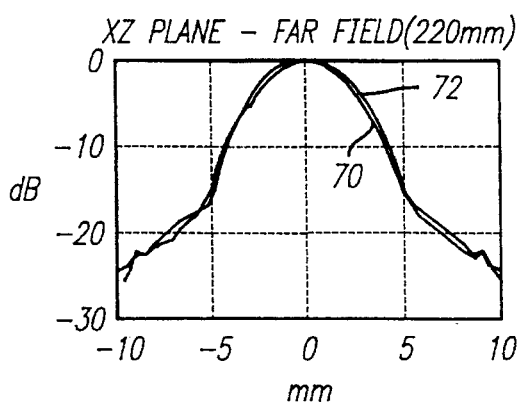
Figure 9F:
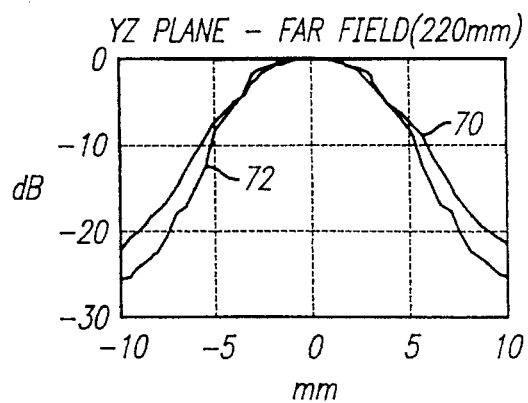

The coarse-fine array 60 (see FIG. 5) has three receive rows 46, 58 and three transmit rows 52, 58. Each row 46, 52, 58 has 64 elements per row spaced at 0.3 mm along the azimuth. The rows span 14 mm along the elevation. The conventional 1.5D array used for comparison has seven time-shared rows performing both transmit and receive operations with 64 elements per row at 03 mm spacing along the azimuth. The rows span 7 mm along the elevation. For each embodiment elevation spacing is on the order of a few wavelengths up to approximately 10 wavelengths, while azimuthal spacing is typically 0.25 or 0.5 wavelengths up to approximately 2.0 wavelengths. The curves 70 represent the coarse-fine array 40 beam patterns. The curves 72 represent the conventional 1.5D array beam patterns. FIG. 9a shows the 40 mm (near field) beam patterns in the XZ plane. FIG. 9b shows the 40 mm (near field) beam patterns in the YZ plane. FIG. 9c shows the focal plane beam patterns at 100 mm in the XZ plane. FIG. 9d shows the focal plane beam patterns at 100 mm in the YZ plane. FIG. 9e shows the 220 mm (far field) beam patterns in the XZ plane. FIG. 9f shows the 220 mm (far field) beam patterns in the YZ plane. The XZ plane results of FIGS. 9a, 9c, and 9e are nearly identical for the two arrays. The YZ plane results vary, however, with coarse-fine array 60 results being substantially equivalent to the conventional 1.5D array (especially in far field performance). The near field performance of the coarse-fine array 60 includes side lobes which can be problematic.

FIGS. 10a–f show the beam pattern comparisons for a 64×1.5D coarse-fine array 62 and a 64×1.5D conventional coarse-fine array at various depths in XZ and YZ planes according to spatial impulse response simulations. The excitation waveform is generated as $v(t)=At^3 e^{-kft}\cos(2\pi ft)$, where k=3.833, A=1 and f=2.5 MHz. Simulation computations are based upon the algorithms described in "Diffraction impulse response of rectangular transducers" by Jose Luis San Emeterio and Juis G. Ullate; JASA 1992.

Figure 10A:
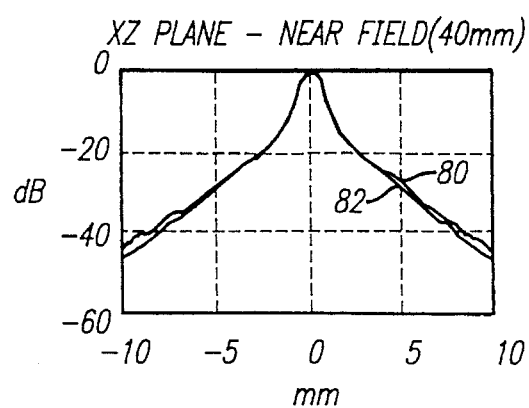
FIGS. 10a–f are beam pattern comparisons between an alternative 1.5D coarse-fine array embodiment and a conventional 1.5D array for XZ and YZ scan-planes at three depths.
Figure 10B:
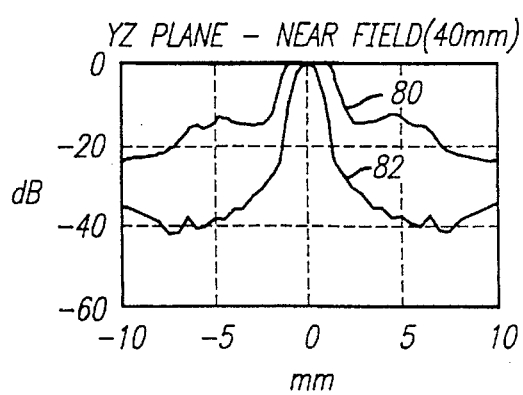
Figure 10C:
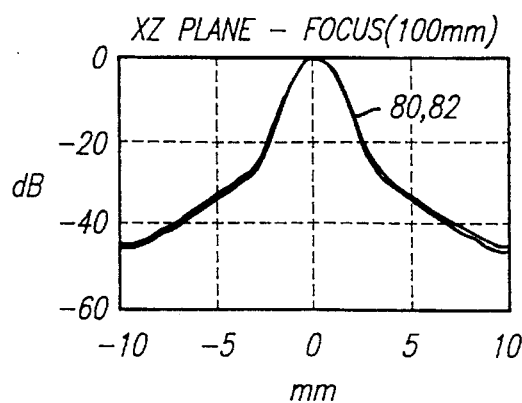
Figure 10D:
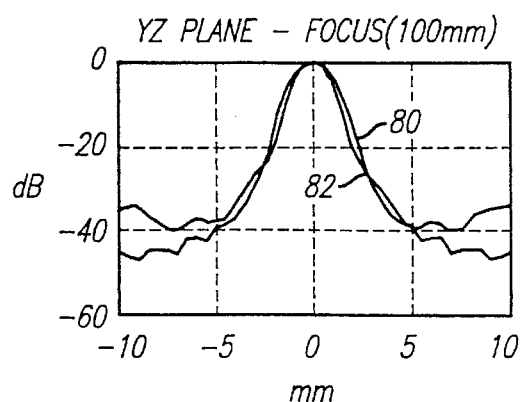
Figure 10E:
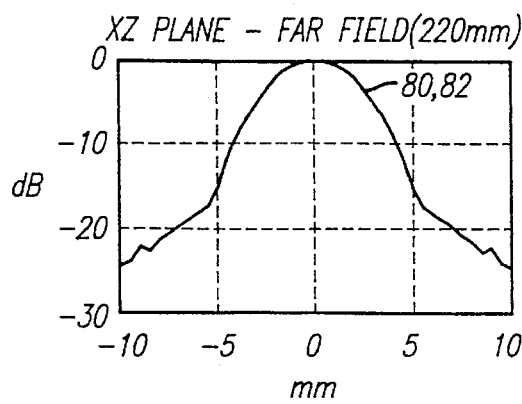
Figure 10F:
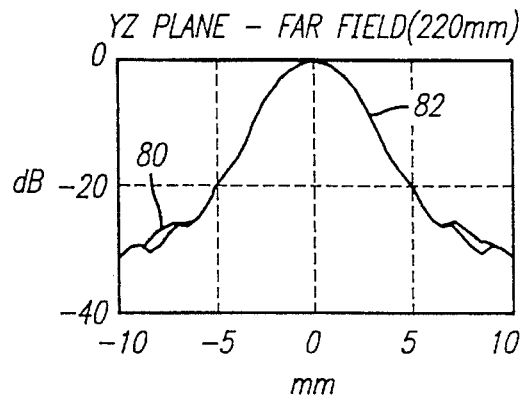

The coarse-fine array 62 (see FIG. 6) has seven receive rows 46, 58 and seven transmit rows 52, 58. Each row 46, 52, 58 has 64 elements per row at an azimuthal spacing of 03 mm. The rows span 28 mm along the elevation. The center seven rows (used in transmission) span 14 mm along the elevation. The conventional 1.5D array used for comparison has fifteen time-shared rows performing both transmit and receive operations with 64 elements per row at 03 mm azimuthal spacing. The rows span 28 mm along the elevation. The curves 80 represent the coarse-fine array 62 beam patterns. The curves 82 represent the conventional 64×15 1.5D array beam patterns. FIG. 10a shows the 40 mm (near field) beam patterns in the XZ plane. FIG. 10b shows the 40 mm (near field) beam patterns in the YZ plane. FIG. 10c shows the focal plane beam patterns at 100 mm in the XZ plane. FIG. 10d shows the focal plane beam patterns at 100 mm in the YZ plane. FIG. 10e shows the 220 mm (far field) beam patterns in the XZ plane. FIG. 10f shows the 220 mm (far field) beam patterns in the YZ plane. The XZ plane results of FIGS. 10a, 10c and 10e again are nearly identical. The YZ plane results are improved relative to the FIGS. 9 comparisons in that lower side lobes levels occur at the focal plane and far field patterns. The best results for the coarse-fine array 62 are in the focal plane and far field.

1.5D Coarse-Fine Array Operation—Dual-Transmit Mode

As the coarse-fine array advantage typically is not realized for near field scanning, an alternate dual-transmit mode operation also is defined in some embodiments. According to a dual-transmit mode, a conventional 1.5D array configuration having coincident transmit and receive apertures is used for near field scanning, while a 1.5D coarse-fine configuration is used for focal plane and far field scanning. A switching arrangement is used for iteratively switching between the conventional configuration and 1.5D configuration so as to obtain the near-field response and the focal plane and far-field response. Switching speeds of several kilohertz (e.g., 2–3 kHz) are used. To perform dual-transmit mode, frame rate is reduced so that the dual transmission of one frame can be combined. The combined beam profile exhibits the better near field performance of the conventional array and the better focal plane and far field performance of the coarse-fine array.

1.5D Coarse-Fine Array Performance—Dual-Transmit Mode

FIGS. 11a–f show beam pattern comparisons of a 64×7 1.5D coarse-fine array and a 64×15 1.5D conventional array at various depths in XZ and YZ planes according to a spatial impulse response simulation. The excitation waveform is generated as $v(t)=At^3 e^{-kft}\cos(2\pi ft)$, where k=3.833, A=1 and f=2.5 MHz. Simulation computations are based upon the algorithms described in "Diffraction impulse response of rectangular transducers" by Jose Luis San Emeterio and Juis G. Ullate; JASA 1992.

Figure 11A:
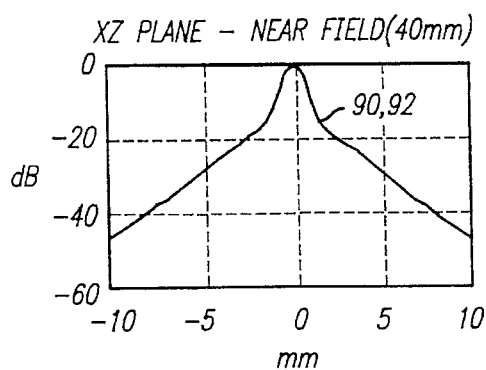
FIGS. 11a–f are beam pattern comparisons between a dual-transmit mode 1.5D coarse-fine array embodiment and a conventional 1.5D array for XZ and YZ scan-planes at three depths.
Figure 11B:
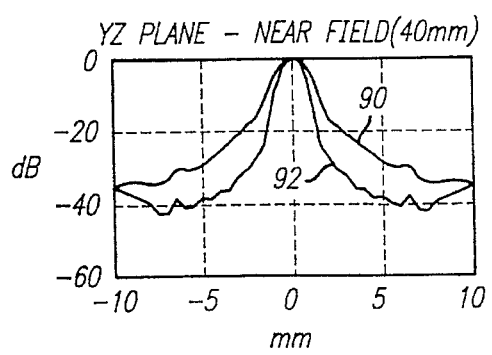
Figure 11C:
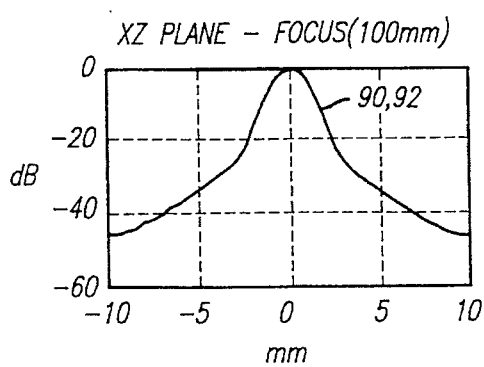
Figure 11D:
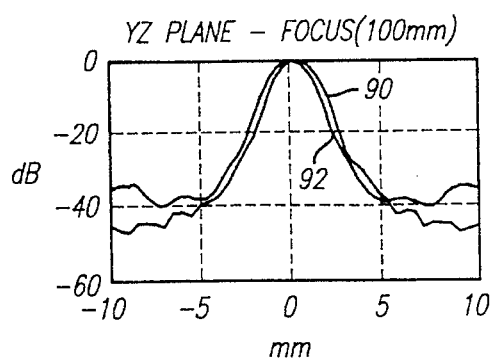
Figure 11E:
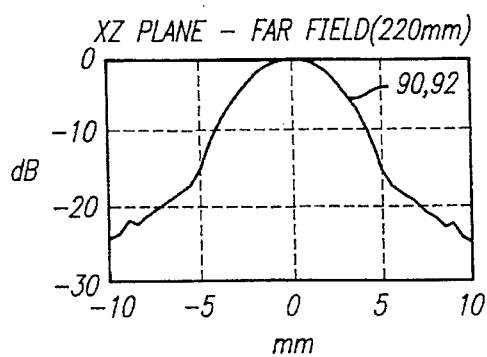
Figure 11F:
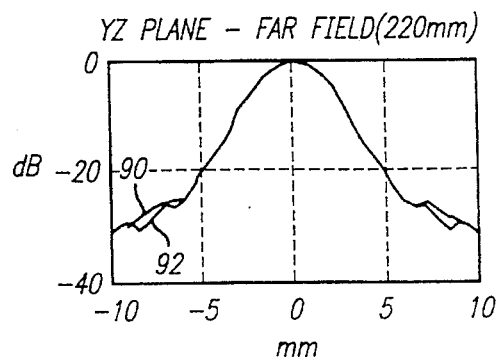

The coarse-fine array has fifteen receive rows and seven transmit rows. Each row has 64 elements per row spaced at 03 mm along the azimuth. The receive rows span 28 mm along the elevation. The transmit rows span 14 mm along the elevation. The conventional 1.5D array used for comparison has seven time-shared rows performing both transmit and receive operations with 64 elements per row at 0.3 mm spacing along the azimuth. The rows span 14 mm along the elevation. The coarse-fine array operates at one-half the frame rate of the conventional array. The curves 90 represent the coarse-fine array beam patterns. The curves 92 represent the conventional 1.5D array beam patterns. FIG. 11a shows the 40 mm (near field) beam patterns in the XZ plane. FIG. 11 shows the 40 mm (near field) beam patterns in the YZ plane. FIG. 11c shows the focal plane beam patterns at 100 mm in the XZ plane. FIG. 11d shows the focal plane beam patterns at 100 mm in the YZ plane. FIG. 11e shows the 220 mm (far field) beam patterns in the XZ plane. FIG. 11f shows the 220 mm (far field) beam patterns in the YZ plane. The XZ plane results of FIGS. 11a, 11c, and 11e are nearly identical for the two arrays. The YZ plane results vary somewhat, but are improved in the near field over the normal mode results.

Meritorious Effects and Advantages

One advantage of the invention is that disclosed transducer structures improve elevational focusing. Another advantage of the invention is that the use of fewer processing channels frees up processor time for performing more intensive vector/image processing tasks. The trade-off in instances leads to improved image quality. Yet another advantage is that the fewer or relatively fewer receiver elements leads to reduced component costs.

For large elevation apertures (e.g. >20 wavelengths), the coarse-fine array 26 reduces the number of channels needed effectively operate an ultrasound transducer probe. In particular, detailed resolution (i.e., main lobe pattern) is improved up to −20 dB. For small elevation apertures, limiting operation to the focal plane and far field avoids side lobe noise levels of the near field.

What is claimed is:

1. A method of performing an ultrasound scan of a patient with an array of transducer elements, the array comprising a plurality of rows spaced apart along an elevational direction, each one of the rows comprising a plurality of the transducer elements spaced apart along an azimuthal direction, the number of rows being less than the number of transducer elements in a given row, the method comprising the steps of:

defining a first elevation aperture for transmitting ultrasound signals from a first plurality of rows of the transducer elements;

defining a first azimuthal aperture for transmitting ultrasound signals from a plurality of the transducer elements within each one of the first plurality of rows;

transmitting ultrasound signals into the patient from the plurality of transducer elements defined by the elevation aperture and azimuthal aperture;

defining a second elevation aperture for receiving ultrasound signals at a second plurality of rows of the transducer elements;

defining a second azimuthal aperture for receiving ultrasound signals at a plurality of the transducer elements within each one of the second plurality of rows;

receiving reflected signals of the transmitted ultrasound signals from the patient at the plurality of transducer elements defined by the second elevation aperture and second azimuthal aperture; and wherein average row spacing of the first plurality of rows along the elevational direction defines a first spacing, average row spacing of the second plurality of rows along the elevational direction defines a second spacing, and the first spacing is different than the second spacing.

2. The method of claim 1 in which the first spacing is less than the second spacing.

3. The method of claim 1 in which the first elevation aperture spans a length less than the second elevation aperture.

4. The method of claim 1 in which the first elevation aperture spans a same length as the second elevation aperture.

5. The method of claim 1 in which the second spacing is either one of approximately the same or greater than the first elevation aperture.

6. The method of claim 1 in which a beam-pattern is defined from the ultrasound transmit signals and received reflected signals based upon beam-forming control parameters which consist of azimuthal aperture, focussing, apodization and steering parameters and elevational aperture, focussing and apodization parameters, wherein the elevational focussing is symmetrical and the elevational apodization is symmetrical.

7. The method of claim 6 in which the larger second spacing enables improved elevational focus without substantially increasing side lobe levels in a focal plane portion and far field portion of the defined beam-pattern.

8. An ultrasound transducer used in performing an ultrasound scan of a patient, comprising:

a first plurality of rows of transducer elements spaced along an elevational direction, each one row of the first plurality of rows comprising a plurality of transducer elements spaced along an azimuthal direction;

a second plurality of rows of transducer elements spaced along an elevational direction, each one row of the second plurality of rows comprising a plurality of transducer elements spaced along the azimuthal direction;

wherein the aggregate number of rows formed by the first plurality of rows and second plurality of rows is less than the number of transducer elements in a given row among the first plurality of rows and second plurality of rows;

wherein the first plurality of rows spaced along the elevational direction define a first elevation aperture and the pluralities of transducer elements among the first plurality of rows spaced along the azimuthal direction define a first azimuthal aperture through which ultrasound signals are transmitted;

wherein the second plurality of rows spaced along the elevational direction define a second elevation aperture and the pluralities of transducer elements among the second plurality of rows spaced along the azimuthal direction define a second azimuthal aperture through which reflected ultrasound signals are received; and wherein average row spacing of the first plurality of rows along the elevational direction defines a first spacing, average row spacing of the second plurality of rows along the elevational direction defines a second spacing, and the first spacing is different than the second spacing.

9. The transducer of claim 8 in which the first spacing is less than the second spacing.

10. The transducer of claim 9 in which a beam-pattern is defined from the ultrasound transmit signals and received reflected signal based upon beam-forming control parameters which consist of azimuthal aperture, focussing, apodization and steering parameters and elevational aperture, focussing and apodization parameters, wherein the elevational focussing is symmetrical and the elevational apodization is symmetrical.

11. The transducer of claim 10 in which the larger second spacing enables improved elevational focus without substantially increasing side lobe levels in a focal plane portion and far field portion of the defined beam-pattern.

12. The transducer of claim 8 in which the first elevation aperture spans a length less than the second elevation aperture.

13. The transducer of claim 8 in which the first elevation aperture spans a same length as the second elevation aperture.

14. The transducer of claim 8 in which at least one row among the first plurality of rows comprises a different number of transducer elements along the azimuthal direction than at least one row among the second plurality of rows.

15. The transducer of claim 8, in which the first spacing is less than two wavelengths of a transmitted ultrasound signal, and the second spacing is greater than two wavelengths of the transmitted ultrasound signal.

16. The transducer of claim 8, in which at least one of the second plurality of rows is interleaved among the first plurality of rows.

17. The transducer of claim 8, in which focussing of ultrasound signals transmitted through the first elevation aperture is independent of focusing of ultrasound signals received through the second elevation aperture.

18. An ultrasound transducer used in performing an ultrasound scan of a patient, comprising:

a first plurality of rows of transducer elements spaced along an elevational direction, each one row of the first plurality of rows comprising a plurality of transducer elements spaced along an azimuthal direction;

a second plurality of rows of transducer elements spaced along an elevational direction, each one row of the second plurality of rows comprising plurality of transducer elements spaced along the azimuthal direction;

wherein the aggregate number of rows formed by the first plurality of rows and second plurality of rows is less than the number of transducer elements in a given row among the first plurality of rows and second plurality of rows;

wherein the first plurality of rows spaced along the elevational direction define a first elevation aperture and the pluralities of transducer elements among the first plurality of rows spaced along the azimuthal direction define a first azimuthal aperture through which ultrasound signals are transmitted;

wherein the second plurality of rows spaced along the elevational direction define a second elevation aperture and the pluralities of transducer elements among the second plurality of rows spaced along the azimuthal direction define a second azimuthal aperture through which reflected ultrasound signals are received; and wherein average row spacing of the first plurality of rows along the elevational direction defines a first spacing, average row spacing of the second plurality of rows along the elevational direction defines a second spacing, the first spacing is different than the second spacing, and in which the second spacing is either one of approximately the same or greater than the first elevation aperture.

19. A method of performing an ultrasound scan of a patient with an array of transducer elements, the array comprising a plurality of rows spaced apart along an elevational direction, each one of the rows comprising a plurality of the transducer elements spaced apart along an azimuthal direction, the number of rows among the first plurality of rows being less than the number of transducer elements in a given one row of the first plurality of rows, the method comprising the steps of:

defining a first elevation aperture comprising a first plurality of rows of the transducer elements through which ultrasound signals are transmitted and received during a first mode for performing near field scanning;

defining a first azimuthal aperture from a plurality of the transducer elements within each one of the first plurality of rows through which the ultrasound signals are transmitted and received during the first mode;

defining a second elevation aperture for transmitting ultrasound signals from a second plurality of rows of the transducer elements;

defining a second azimuthal aperture for transmitting ultrasound signals from a plurality of the transducer elements within each one of the second plurality of rows;

transmitting ultrasound signals into the patient from the plurality of transducer elements defined by the second elevation aperture and second azimuthal aperture during a second mode for performing far field scanning;

defining a third elevation aperture for receiving ultrasound signals at a third plurality of rows of the transducer elements;

defining a third azimuthal aperture for receiving ultrasound signals at a plurality of the transducer elements within each one of the third plurality of rows;

receiving reflected signals of the transmitted ultrasound signals from the patient at the plurality of transducer elements defined by the third elevation aperture and third azimuthal aperture during the second mode; and iteratively switching between the first and second modes;

combining received ultrasound signal profiles for near field and far field; and wherein average row spacing of the second plurality of rows along the elevational direction defines a first spacing, average row spacing of the third plurality of rows along the elevational direction defines a second spacing, and the first spacing is different than the second spacing.

20. The method of claim 19 in which the first spacing is less than the second spacing.

21. The method of claim 19 in which the second elevation aperture spans a length less than the third elevation aperture.

22. The method of claim 19, in which the first spacing is less than two wavelengths of a transmitted ultrasound signal, and the second spacing is greater than two wavelengths of the transmitted ultrasound signal.

* * * * *